(12) United States Patent
McMinn

(10) Patent No.: US 8,890,352 B2
(45) Date of Patent: Nov. 18, 2014

(54) POWER GENERATOR FOR EXTRACTING ENERGY FROM A LIQUID FLOW

(71) Applicant: Derek James Wallace McMinn, West Midlands (GB)

(72) Inventor: Derek James Wallace McMinn, West Midlands (GB)

( * ) Notice: Subject to any disclaimer, the term of this patent is extended or adjusted under 35 U.S.C. 154(b) by 0 days.

(21) Appl. No.: 13/745,168

(22) Filed: Jan. 18, 2013

(65) Prior Publication Data

US 2013/0180236 A1 Jul. 18, 2013

Related U.S. Application Data

(63) Continuation-in-part of application No. 13/297,524, filed on Nov. 16, 2011, now abandoned, which is a continuation of application No. 12/673,297, filed as application No. PCT/GB2009/002112 on Sep. 2, 2009, now Pat. No. 8,072,088.

(30) Foreign Application Priority Data

Sep. 5, 2008 (GB) ................................ 0816218.2

(51) Int. Cl.
| | |
|---|---|
| *F03B 13/10* | (2006.01) |
| *F03B 17/06* | (2006.01) |
| *F04B 17/00* | (2006.01) |
| *F03B 13/24* | (2006.01) |
| *F15B 13/00* | (2006.01) |
| *F03B 13/14* | (2006.01) |
| *F03B 13/26* | (2006.01) |
| *F04B 7/00* | (2006.01) |
| *F04B 7/02* | (2006.01) |

(52) U.S. Cl.
CPC . *F04B 7/00* (2013.01); *F03B 17/06* (2013.01); *F05B 2240/12* (2013.01); *Y02E 10/38* (2013.01); *F04B 17/00* (2013.01); *F03B 13/24* (2013.01); *F05B 2240/40* (2013.01); *F15B 13/00* (2013.01); *F05B 2250/323* (2013.01); *F03B 13/142* (2013.01); *F03B 13/266* (2013.01); *Y02E 10/32* (2013.01); *F04B 7/02* (2013.01); *F03B 13/144* (2013.01); *Y02E 10/28* (2013.01)
USPC ............................................... 290/54; 60/445

(58) Field of Classification Search
CPC ......... Y02E 10/28; Y02E 10/22; F03B 13/10; F03B 17/063
See application file for complete search history.

(56) References Cited

U.S. PATENT DOCUMENTS

| 845,214 A | 2/1907 | Bazin |
|---|---|---|
| 4,013,379 A | 3/1977 | Bolding |

(Continued)

FOREIGN PATENT DOCUMENTS

| CL | 3474-2007 A1 | 6/2008 |
|---|---|---|
| CL | 1237-2008 A1 | 8/2008 |

(Continued)

OTHER PUBLICATIONS

UKIPO Search Report for UK Patent Application No. 0816218.2, dated Jan. 12, 2009.

(Continued)

*Primary Examiner* — Michael Zarroli
(74) *Attorney, Agent, or Firm* — Bingham McCutchen LLP

(57) ABSTRACT

The invention provides a device for extracting energy from a liquid flow. The device has a housing with one or more entry ports through which liquid flow can enter the housing and multiple exit ports through which liquid flow can leave the housing. An air compression chamber is provided along with multiple valve members which are operable to regulate flow of the liquid through the multiple exit ports. The exit ports are arranged in an array inclined in the direction of liquid flow and the valve members are operable to close the exit ports downstream of the liquid flow consecutively as the liquid flow is incident on each exit port, which progressively diverts flow of the liquid towards the air compression chamber and compresses air in the air compression chamber, and to open the exit ports on a return flow of liquid from the air compression chamber.

20 Claims, 9 Drawing Sheets

(56) References Cited

U.S. PATENT DOCUMENTS

| | | |
|---|---|---|
| 4,018,051 A | 4/1977 | Gay |
| 4,078,871 A | 3/1978 | Perkins, Jr. |
| 4,141,670 A | 2/1979 | Russell |
| 4,466,244 A | 8/1984 | Wu |
| 5,222,833 A | 6/1993 | Gorlov |
| 5,507,943 A | 4/1996 | Labrador |
| 5,584,179 A | 12/1996 | Isa |
| 5,715,856 A | 2/1998 | Martin et al. |
| 7,611,325 B2 | 11/2009 | Caldwell |
| 7,834,475 B1 | 11/2010 | Costas |
| 2009/0102199 A1 | 4/2009 | Voropaev |

FOREIGN PATENT DOCUMENTS

| | | |
|---|---|---|
| CL | 2021-2009 | 11/2009 |
| EP | 0948716 A1 | 10/1999 |
| FR | 2506394 A1 | 11/1982 |
| GB | 2034412 A | 6/1980 |
| GB | 2161544 A | 1/1986 |
| GB | 2250321 A | 6/1992 |
| GB | 2429243 A | 2/2007 |
| GB | 2434840 A | 8/2007 |
| JP | S5343152 A | 4/1978 |
| JP | 57181976 A | 11/1982 |
| JP | 4019362 A | 1/1992 |
| WO | WO-8601259 A1 | 2/1986 |
| WO | WO-02/066829 A1 | 8/2002 |
| WO | WO-03/081029 A1 | 10/2003 |

OTHER PUBLICATIONS

UKIPO Examination Report for UK Patent Application No. 0816218.2, dated Jun. 3, 2009.
Response to UKIPO Examination Report for UK Patent Application No. 0816218.2, dated Jul. 2, 2009.
UKIPO Communication for Response to Examination Report for UK Patent Application No. 0816218.2, dated Jul. 12, 2009.
GB Search Report issued for Application No. GB0816218.2 dated Jan. 12, 2009.
CL Examination Report issued for No. 475-11 dated Mar. 4, 2011.
US Search Report issued for U.S. Appl. No. 12/673,297.
International Search Report issued for International Application No. PCT/GB2009/002112 issued on Dec. 17, 2010 and mailed on Dec. 23, 2010.
Japanese Office Action dated Jul. 30, 2013 for corresponding Chinese Patent Application No. 2011-525608, English translation of "Notification of Reason for Rejection".
Australian Office Action dated Jun. 6, 2013 for Patent Application No. 2009289048.
Chinese Office Action dated Apr. 3, 2013 for corresponding Chinese Patent Application No. 200980144321.6 English translation summary.
European Office Action dated Jul. 16, 2012 for Patent Application No. 09785040.8.
British Office Action dated Nov. 14, 2011 for Patent Application No. GB0816218.2.

POWER GENERATOR FOR EXTRACTING ENERGY FROM A LIQUID FLOW

CROSS-REFERENCE TO RELATED APPLICATIONS

This application is a continuation-in part of and claims priority to pending U.S. patent application Ser. No. 13/297,524, filed Nov. 16, 2011, which is a continuation of U.S. patent application Ser. No. 12/673,297, filed Feb. 12, 2010 (now U.S. Pat. No. 8,072,088), which is a national-phase entry under 35 U.S.C. §371 of PCT Application Serial No. PCT/GB2009/002112, filed Sep. 2, 2009, which claims priority from United Kingdom Application No. GB 0816218.2, filed Sep. 5, 2008, the disclosures of which are hereby incorporated by reference in their entirety.

TECHNICAL FIELD

Embodiments of the present invention relate to renewable energy sources and, more particularly, to methods and systems for extracting energy from a liquid flow.

BACKGROUND

Recent years have seen the interest in the development of renewable energy sources increase as concern over the impact of carbon emissions on the environment has been heightened. Whilst focus has been primarily on the development of wind and solar power, these technologies have various disadvantages. Wind power generation is reliant upon the presence of driving wind of a given threshold value to move the propeller at sufficient speed to drive a turbine. Wind power also requires a large area of land dedicated to the production of energy and these large 'wind farms' are often unsightly and may pose a hazard to the surrounding wildlife. Solar power also has the disadvantages of providing a non-reliable source of electricity and also suffers from low efficiency and high cost.

Wave or tidal energy devices can overcome many of the disadvantages listed above. They provide a reliable source of energy as they are driven by the force inherent within tidal and ocean waves and also have the potential to be placed in a large number of areas, particularly in coastal areas with large fetch, such as the western coast of Europe.

A number of differing techniques have been employed to harness wave, tidal or ocean power. Traditional tidal energy devices have centred on a barrier arrangement that when placed within a tidal system fills with water at high tide and releases the water at low tide through a turbine to generate electricity. Concerns have been raised that the use of conventional barrier type tidal energy devices can prove hazardous to wildlife and boats. Additionally, these devices may only be used after each high tide and do not therefore provide a constant supply of energy.

One example of a wave energy collector is disclosed within EP 1115976. This device utilises the relative rotational movement between pluralities of segments to drive a hydraulic motor.

One alternative technique is to use the oscillatory nature of waves to compress a volume of air (an Oscillating Water Column device). By submerging a structure with an air chamber and an underwater aperture, an incident surface wave makes the liquid level within the chamber rise, compressing the volume of air within the air chamber. This (adiabatically) compressed air may then be used to drive a turbine, the rotation of which may be used to power a generator. As the water level falls, the air pressure reduces and air is drawn back into the chamber through the turbine. An example of this type of device is shown within EP 0948716 whereby the parabolic wave is focussed into a chamber wherein the air is compressed and used to drive a unidirectional turbine. Another example of an Oscillating Water Column device has been developed by Wavegen and has been named the 'Limpet'.

One inherent problem of these devices is the relatively low energy conversion efficiency, coupled to the varying nature of the size and strength of the incident waves, which leads to an uncertain energy output. These devices are also located on or close to the shore to take advantage of the higher parabolic waves at the shore. This again leads to a variation in the production of energy between high and low tides. Additionally, the above devices focus parabolic ocean waves through structural features, for example an upwardly sloped base or a generally upright wall. These devices are also unsuitable in scenarios of constant flow or current, for example tidal flows; thermohaline induced oceanic currents, for example the North Atlantic Drift and the Gulf Stream; and gravity induced liquid flows, for example within rivers.

SUMMARY

The present invention relates to a device for extracting energy from a liquid flow, and more particularly to a power generator generating air pressure variations that may be used to drive an air turbine.

The present invention aims to overcome these problems by providing an improved device for extracting energy from a liquid flow.

It is a further aim of the present invention to provide an improved liquid power generator. It is a further aim of the present invention to provide a liquid power device that requires little maintenance.

According to a first aspect of the present invention, there is provided a device for extracting energy from a liquid flow, the device comprising: a housing with one or more entry ports through which liquid flow can enter the housing and a plurality of exit ports through which liquid flow can leave the housing; an air compression chamber; and a plurality of valve members, operable to regulate flow of the liquid through the plurality of exit ports; wherein the exit ports are arranged in an array inclined in the direction of liquid flow and the valve members are operable to close the exit ports downstream of the liquid flow consecutively as the liquid flow is incident thereon, thereby progressively diverting flow of the liquid towards the air compression chamber and compressing air therein, and to open the exit ports on a return flow of liquid from the air compression chamber.

According to a second aspect of the present invention, there is provided a device for generating a pressure surge from a liquid flow, the device comprising: a housing with one or more entry ports through which a liquid flow can enter the housing and a plurality of exit ports through which the liquid flow can leave the housing; an air compression chamber; and a plurality of valve members, operable to regulate flow of the liquid flow through the plurality of exit ports; wherein the exit ports are arranged in an array inclined in the direction of liquid flow and the valve members are operable to: consecutively close the exit ports downstream of the liquid flow as the liquid flow is incident thereon, thus increasing the pressure of liquid within the housing and generating a pressure surge that diverts the liquid flow towards the air compression chamber, compressing air therein; and to open the exit ports when the pressure of liquid within the housing is reduced.

It is an advantage that the device is configured to divert (or focus) the energy in a flow of liquid to compress the air in an air compression chamber. The device is configured so that this can occur in a cyclical manner. The consecutive and progressive closing of the valve members diverts the flow of liquid to compress the air in the air compression chamber. The liquid, which then flows back out of the air compression chamber, is allowed to flow through the exit ports or apertures by the opening of the valve members. Another compression cycle can then commence by the progressive closing of the valve members. Accordingly the device may be used in any flowing liquid, such as a river, or tidal flow or ocean current, to extract energy in the form of compressed air.

Embodiments of the invention may further comprise an accumulation chamber for storing compressed air that has been compressed in the air compression chamber.

Advantageously, the device may further comprise a turbine operable to be driven by the compressed air. A decompression chamber may be positioned downstream of the turbine for enhancing a pressure differential across the turbine during the return flow of liquid from the compression chamber.

Advantageously, the entry and exit ports may be provided on opposing faces of the housing. In this case, the entry and exit ports are interchangeable dependent on the direction of the flow of liquid. This allows the device to efficiently handle bi-directional flow, such as found in tidal systems.

In embodiments of the invention, the plurality of valve members and the plurality of exit ports define a plurality of check valves. The valve members may comprise respective buoyant elements. A tether may connect the buoyant elements to the housing. The buoyant element may be a ball and may therefore form a ball check valve with a corresponding exit port. Multiple balls can be connected by chains and eyes to form a linked set of valve members. The tether may be a rod to which the set of valve members is connected.

The buoyant elements can have an angular displacement required to close the exit ports, this angular displacement increasing along the inclined array. Due to the buoyancy of the buoyant elements, the valve members may attempt to float away from the tether. In certain embodiments, the buoyancy of the buoyant elements may increase along the inclined array (e.g. away from the tether).

The liquid may comprise water.

In embodiments of the invention, the array may extend in an upward gradient in the direction of the liquid flow. The array may comprise rows and columns of valves (exit ports with associated valve members).

The valve members and their associated exit ports (e.g. valve apertures) may be configured as pulse valves. Such valves accentuate a liquid hammer effect caused by the sudden closure of a valve member against its associated exit port.

The valve members and their associated exit ports may be configured as flap valves. These flap valves may comprise respective buoyant elements. The buoyant elements may have an angular displacement required to close the flap valves, the angular displacement associated with each row of valves increasing along the inclined array. The buoyancy of the buoyant elements provided in each row may also increase along the inclined array and the buoyant elements may comprise tyres.

In embodiments of the invention the valve members comprise spoiler elements to facilitate the deflection of the liquid flow along the inclined array and/or assist the opening of the exit ports during the return flow.

Further embodiments comprise a stabiliser for holding the device at a predetermined position. This stabiliser may take the form of an anchor, mooring ropes, chains or any other anchorage.

Aspects of the invention further comprise use of the device as a tidal energy device, to drive a water turbine or to pump water to a higher reservoir. Additional embodiments comprise the use of the device as an oceanic or river flow device. In use, the device may be partially submerged within the liquid or it may be fully submerged depending upon the desired use and operating conditions.

In final embodiments, multiple devices may be arranged or linked together to form a network of devices positioned to optimise power extraction from the liquid flow.

BRIEF DESCRIPTION OF THE DRAWINGS

The invention will now be described, by way of example, with reference to the accompanying drawings, in which.

DETAILED DESCRIPTION

Figure 1:
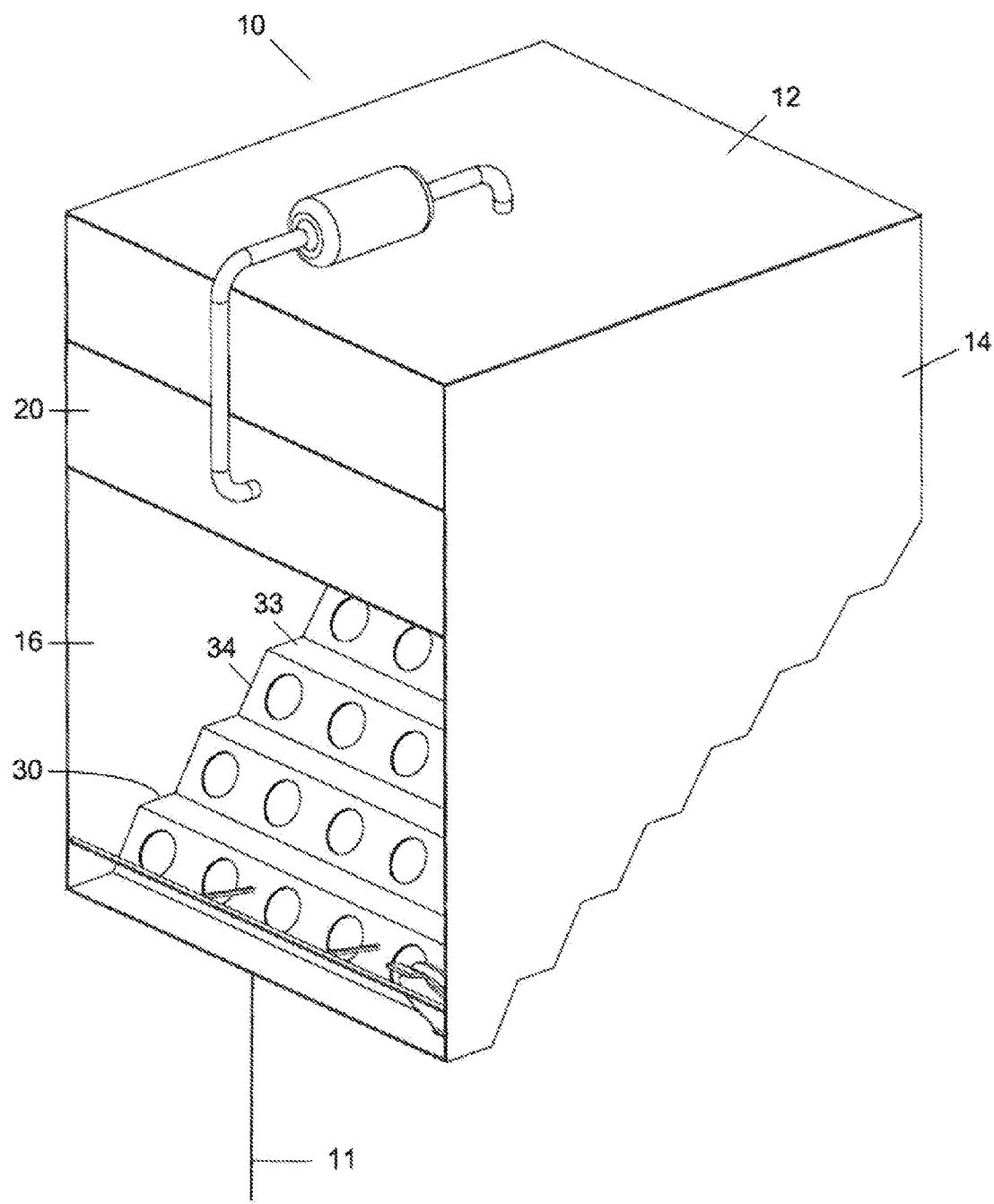
FIG. 1 is a simplified perspective view of a device for extracting energy from a liquid flow according to a first embodiment of the invention, prior to submersion in the liquid.

FIG. 1 shows a simplified perspective view of a device 10 for extracting energy from a liquid flow. The device comprises a roof 12, and side walls 14 that form an opening 16 incident to the flow direction. A top portion 20 of the device 10, below the roof 12, houses an arrangement of air chambers, as will be described in more detail below. The roof 12, side walls 14 and additional structural components may be constructed from concrete, although any material capable of producing a stable, liquid-tight structure may be utilised, for example metals, including steel. A base section 30 extends from the bottom edge of the opening 16, and this will be described in more detail below. The size of the device may be optimised for efficiency and/or to optimise the capture of the liquid and may be based on characteristics of the incident flow, as will be further described below.

Figure 2:
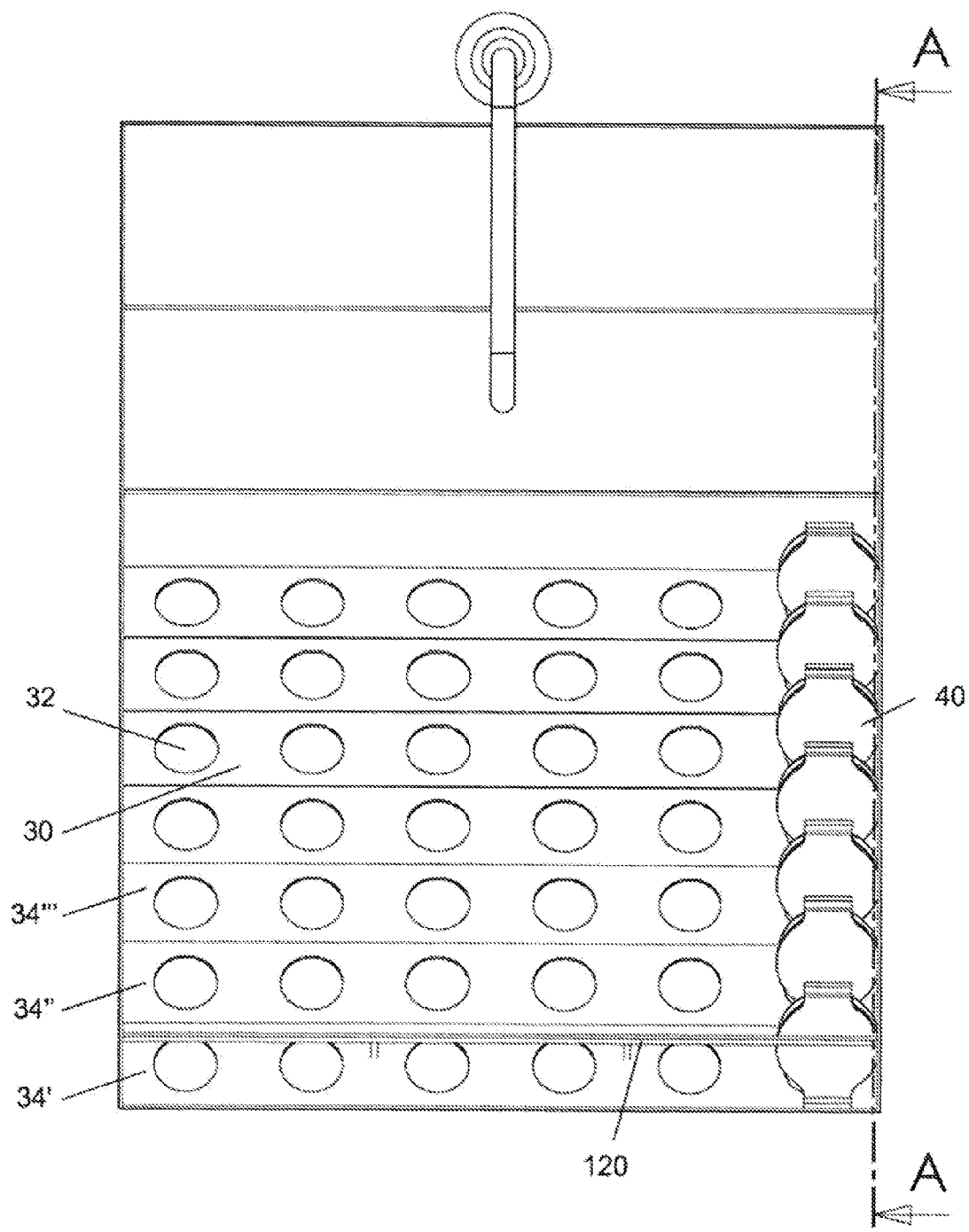
FIG. 2 is an end-on view of the device of FIG. 1, showing an array of valve apertures and valve members in detail.

The base section 30 of the device 10 comprises alternate sloping (inclined) backwalls 34 and horizontal floors 33. FIG. 2 shows an end-on view of the device looking through the opening 16. An array of apertures 32 on the backwalls 34 are covered by a corresponding array of valves 40 (of which only one column of the array is shown in FIG. 2). Additionally, although the array of apertures 32 is shown with a 6×7 arrangement, it may be appreciated that the number of rows and columns of the array may be varied dependent upon the required focussing effect and size of the device. For example, to utilise oceanic or tidal currents the device 10 may feature an array with as many as 200 or more columns and 2000 or more rows. Additionally, multiple devices 10 may be connected together to form a larger structure.

To simplify the figures and allow viewing of the apertures 32, only one column of valves 40 is shown in each figure. The valves 40 are shown as flap valves; however it may be appreciated that other valve types may be employed. The structure of the flap valves 40 is explained in detail below with reference to FIG. 3-5. The purpose of these valves 40 is to channel and regulate the flow of liquid in a manner that will be described in greater detail below. The columns of the valves 40 are shown extending along an upwardly extending gradient in the direction of liquid flow so that each row of valves is located both above and behind the lower row. Although the array is shown with a stepped arrangement, any configuration that provides an upwardly extending gradient may be employed, depending upon the orientation of the device with respect to the incident liquid flow or the required liquid channeling.

Figure 3:
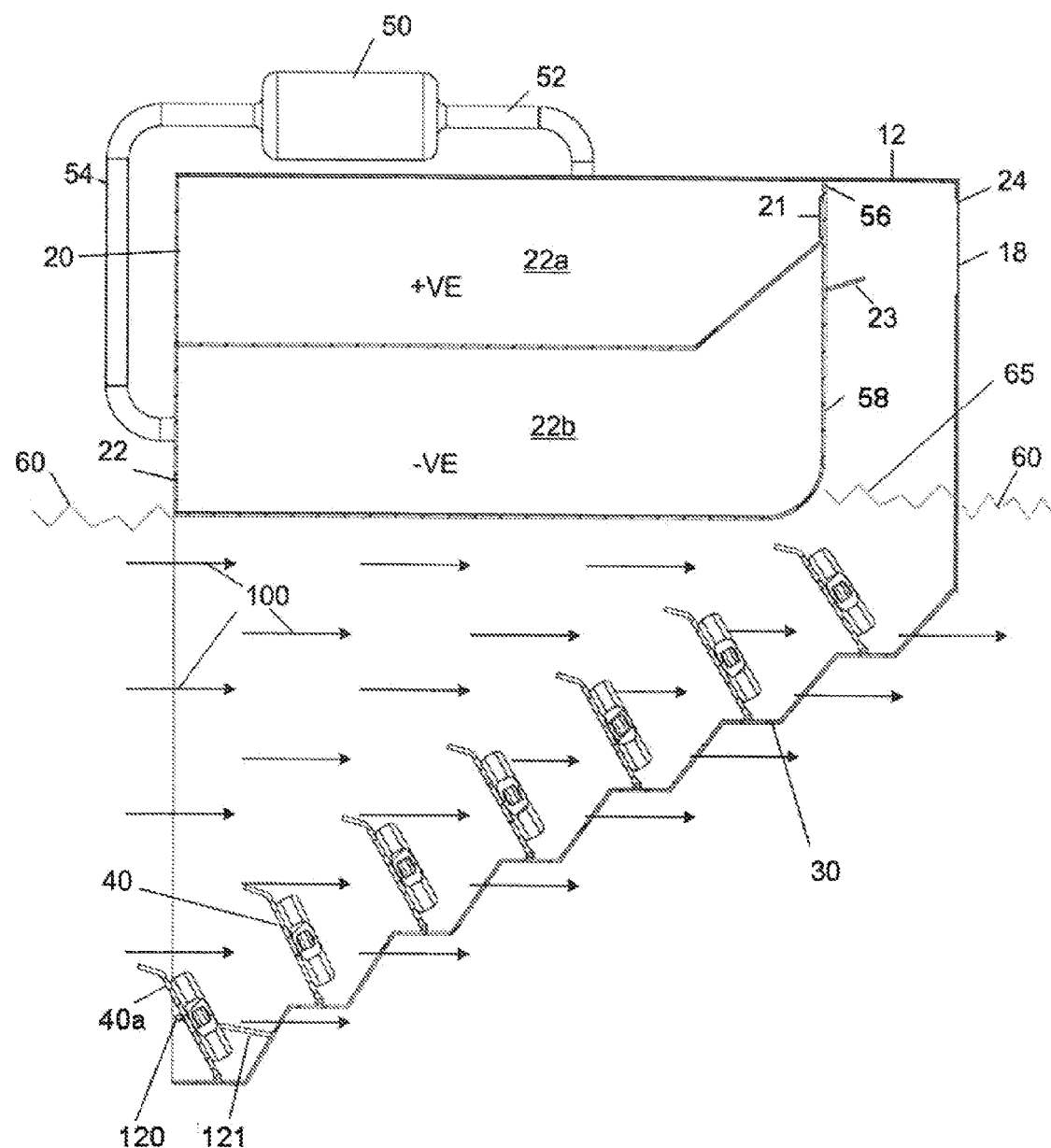
FIG. 3 is a cross-sectional view through the line A-A in FIG. 2 after partial submersion of the device into the liquid flow.

FIG. 3 shows a cross-sectional view through the line A-A marked within FIG. 2. In this figure, the device has been partially submerged into a liquid to a level 60. The valves 40 are open and the level of the liquid 65 within the device is approximately the same as the external level 60. The top portion 20 includes an air compression chamber 24, which is open at its bottom so that the liquid level 65 traps the air inside it, an accumulator chamber 22a, and a decompression chamber 22b. The air trapped between the roof 12, side walls 14, a rear wall 18, chambers 22a, 22b and the liquid 65 defines a space that is considered to be the compression chamber 24. The pressure of air trapped within the compression chamber 24 is also approximately the same as the external air pressure. It may be appreciated that the area and volume of the compression chamber 24 may vary depending upon the relative dimensions of the constricting components (12, 14, 18, 20, 22) and the height of the liquid level 65.

Within the embodiment shown in FIG. 3, the accumulator chamber 22a is provided with a back wall 56 and is connected to or defined by the roof 12, a front wall 22 and sidewalls 14 of the device 10. The decompression chamber 22b is similarly provided with a back wall 58 and is connected to or defined by the front wall 22 and the accumulator chamber 22a. These chambers 22a, 22b act to store air of differing pressure and are connected to each other via an external turbine 50 and couplings in the form of piping 52, 54. One or more flap valves 21, 23 provided on the back walls 56, 58 interconnect the air compression chamber 24 with, respectively, each of the accumulator chamber 22a, and the decompression chamber 22b. As the pressure of the air within the air compression chamber 24 becomes higher than the pressure in the chamber 22a, the valve 21 is forced open by the air pressure until the pressure within the chamber 22a and the air compression chamber 24 are equivalent. Conversely, if the pressure within the chamber 22b is greater than the pressure in the air compression chamber 24, then the valve 23 opens until the pressures are equivalent. These chambers 22a, 22b also act as buoyancy tanks to keep the device floating in the liquid. As shown in FIG. 1, a stabiliser 11 may be employed to secure the device 10 in position and allow the device 10 to face the incident liquid flow. The stabiliser 11 may take the form of an anchor, mooring ropes, chains or any other anchorage.

The operation of the device will now be described in relation to FIGS. 3, 4 and 5. Flow lines are shown for reference only. FIG. 3 shows the device in the relaxed or initial position. In this position, the valves 40 are open, the liquid levels 60, 65 are approximately level and the pressure of the air within the air compression chamber 24 and outside the device are approximately equivalent. An incident flowing liquid or current, represented by the individual flow lines 100 and incident upon the device 10, flows through the opening 16 and acts upon the array of valves 40. The flowing liquid 100 enters the device 10 and acts upon the valves 40. The valves 40 are arranged so that a lowermost row of valves 40a, due to the impulse of the liquid flow 100, is the first to close against the apertures 32. Once a valve 40 has closed, the incident liquid flow 100 is deflected in an upwards direction, increasing the impulse of the liquid flow against the second row of valves that are then also closed by the force of the flow 100. This progressive closing of the valves focuses the flow of the liquid (represented in the figures by the lines of flow 100) into the air compression chamber 24, causing the liquid level 65 within the device 10 to rise, and compressing the air within the chamber 24. This process continues until all the valves 40 are fully closed (FIG. 5). Returning to an intermediate situation (FIG. 4) where (in this representation) 3 of the 7 rows of valves are closed, it is clear that the liquid level 65 within the air compression chamber 24 of the device 10 has increased to a level above the external liquid level 60. This increases the air pressure within the air compression chamber 24, closing the valve(s) 23 between the air compression chamber 24 and the decompression chamber 22b and opening the valve 21 between the air compression chamber 24 and the accumulator chamber 22a.

Figure 4:
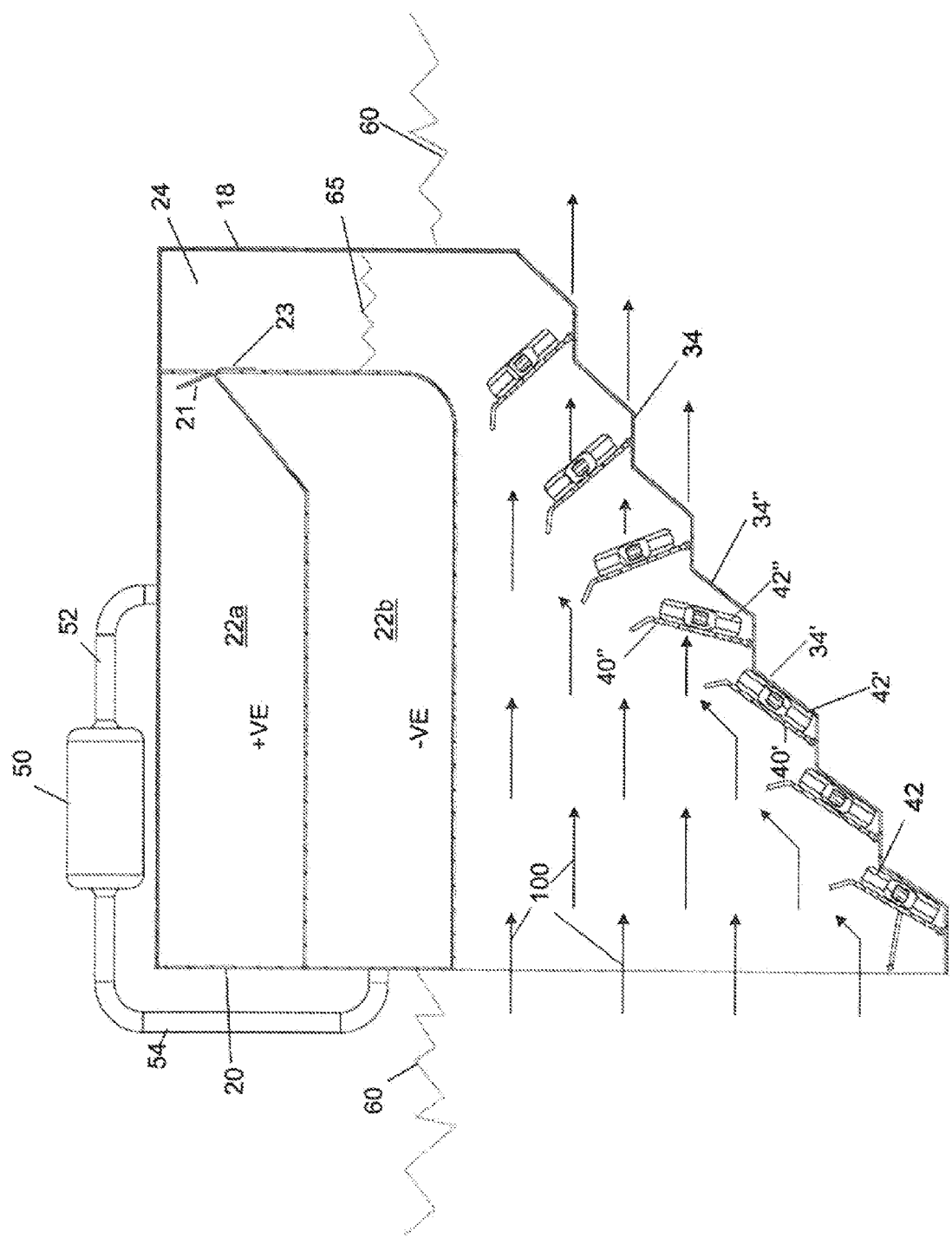
FIG. 4 is a cross-sectional view similar to FIG. 3 and shows partial closure of the valves due to incident liquid flow.
Figure 5:
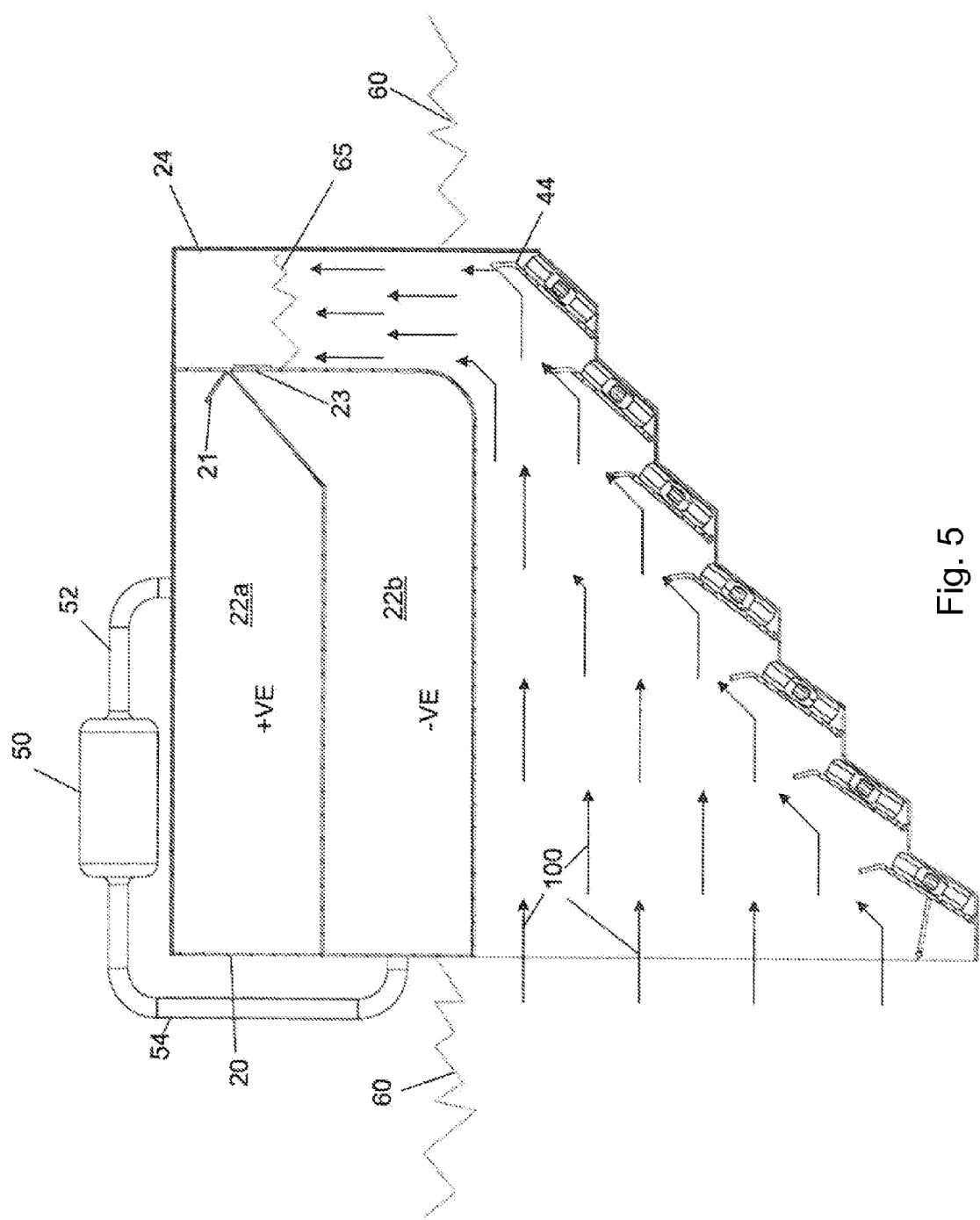
FIG. 5 is a cross-sectional view similar to FIGS. 3 and 4 and shows complete closure of the valves due to incident liquid flow, and the subsequent upsurge of liquid into a compression chamber.

As may be seen from FIG. 4, the valves 40 close sequentially along the upwardly inclined gradient of the valve array. This sequential closing is achieved by varying the buoyancy and angle of closure for the valves between the rows within the array. In this case, the lower valves have lower buoyancy than the valves within the row directly above. In the current embodiment, the valves comprise car tyres 42 of differing tyre pressure. Additionally, the angle of the backwall 34 with respect to the vertical increases along the upward gradient towards the compression chamber 24. For example, a valve 40' in the third row from a lowermost section of the base 30 has a tyre 42' with a lower pressure and smaller angle between its associated backwall 34' and the vertical than a valve 40" in a row above, with tyre pressure 42" and associated backwall 34".

FIG. 5 shows an end state of the device when all the valves 40 are fully closed. The progressive closing of the valves 40 results in an increase in the level of the liquid 65 within the air compression chamber 24. The degree of liquid level 65 increase is dependent upon the number of valves 40 and the impulse of the incident liquid. Although the present embodiment features seven rows of valves, any number of rows may be utilised dependent upon the depth of the liquid and the degree of surge required. The incident flow of the liquid is now concentrated and directed towards and into the air compression chamber 24 (as shown by the lines of flow 100), the volume of which has been reduced by the increasing liquid level 65. This reduction in volume creates a corresponding increase in the air pressure within the air compression chamber 24, which is subsequently transferred to the accumulator chamber 22a.

Once the upward surge of liquid reaches a maximum, the air pressure within the air compression chamber 24 rapidly drops and the inlet valve 21 to the accumulator chamber 22a closes. At this point there is no net liquid flow within the device 10. When the device 10 is in this no-flow equilibrium position, both valves 21 and 23 between the air compression chamber 24 and the chambers 22a, 22b respectively are closed. Due to the operation of the valves 21, 23 and the relative air pressures of the chamber 24 at varying stages of the operation of the device 10, the two chambers 22a, 22b have differing air pressures. In the embodiment shown, accumulator chamber 22a has a greater air pressure than decompression chamber 22b.

The two chambers 22a, 22b are linked by a turbine 50 and inlet and outlet couplings 52, 54. By opening the inlet 52 and outlet 54 couplings to the turbine 50, the positive pressure air in accumulator chamber 22a is drawn through the coupling 52, due to the pressure differential between the two chambers 22a, 22b, into the turbine 50 and through coupling 54 into the decompression chamber 22b. This process drives the turbine 50 and may be used for the generation of electricity via a generator (not shown). Due to the construction of the chambers 22a, 22b and the method of coupling to the turbine 50, the chambers may be used to store the varying pressured air over a number of operating cycles of the device, building up the pressure difference with each cycle. Once a threshold pressure difference is reached, the coupling to the turbine 50 may be opened and the air moved through the turbine 50.

When the device 10 is in the no-flow position the liquid pressure acting upon the front of the valves 40 is the same as the pressure acting on the rear of the valves. The valves therefore begin to open due to the buoyancy of the tyres 42. As the valve closest to the compression chamber 24 has the highest buoyancy, this valve opens first. The liquid level 65 then begins to fall, causing a backward and downward flow of liquid over the valves 40. Due to the spoilers 44 on the top of the valves 40, the downward force of the liquid acts to open the valves, until all of the valves are open, resetting the device 10 to the situation shown in FIG. 3. A rail 120 supported by struts 121 or any other means may be utilised to prevent the valves 40 from opening past a predetermined angle. The device 10 is therefore essentially reset and the process described above is repeated (i.e. the incident liquid flow acts upon, and begins to close, the array of valves). It may therefore be considered that in operation the device 10 generates an oscillatory compression of air within the air compression chamber 24.

As an alternative to the unidirectional turbine 50 described above, a bidirectional flow turbine connected directly to the air compression chamber 24 and the decompression chamber 22b could be used. For example a Wells turbine may be used that is able to rotate in the same direction irrespective to the incident air flow direction.

Although the device 10 has been explained with reference to a single device operating in isolation, it may be envisaged that multiple devices may be linked or placed together to form a cellular network of devices capable of supplying a larger quantity of energy. These devices may act independently or may share common elements, for example air compression and decompression chambers and/or turbines and generators to maximise the efficiency of the devices. Additionally, in order to maximise the flow of liquid through the devices, the network may be arranged into a "U" or "V" shape to prevent escape of the liquid flow around the outside of the network. Alternatively, the devices may be arranged within a shape akin to that of a "stealth bomber", creating an area of low liquid pressure behind the structure. Multiple networks may also be linked or arranged together to optimise extraction of energy from a liquid flow depending upon flow conditions. Although the networks of devices have been described in the orientation described above, any orientation may be utilised to suit the particular flow conditions. In addition, the devices may be arranged in series or stacked to increase the amount of energy that is extracted. The number of devices in the stack may be selected to optimise the return in terms of energy extracted in relation to the construction cost. Also, the stacks may be arranged as a series of devices oriented to receive a flow in one direction, with another series of devices oriented to receive flow in another direction (e.g. the reverse direction). This arrangement is particularly suitable for use in tidal flows and avoids having to turn the devices around when the tide changes direction.

Figure 6:
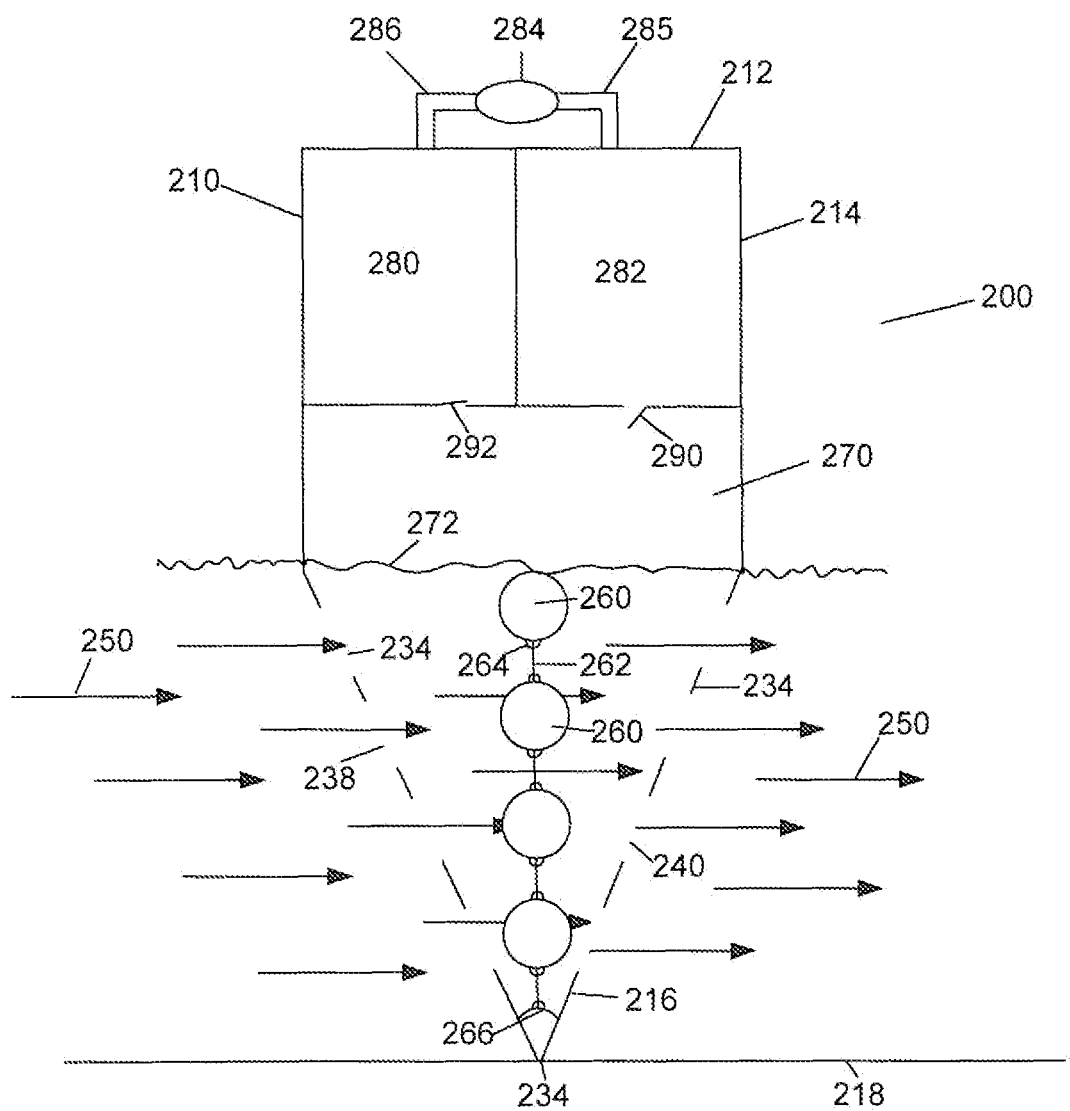
FIG. 6 is a cross-sectional view of a device for extracting energy from a liquid flow according to a second embodiment of the invention when partially submerged in a liquid flow.

FIGS. 6 to 9 show a second embodiment of the invention. FIG. 6 shows a simplified cross-sectional view of a device 200 for extracting energy from a liquid flow. The device 200 comprises a housing 210 with a roof 212, side walls 214 and a V-shaped base 216 connected to a floor 218. A top portion of the housing 210 houses an arrangement of air chambers as will be described in more detail below. As in the embodiment described above, the size of the device may be optimised for efficiency and/or to optimise the capture of the liquid and may be based on characteristics of the incident flow, as will be further described below. The device 200 is made from a rigid material, such as steel.

The base 216 of the device 200 comprises two opposing sloping (inclined) walls 234 which converge together at edge 236 to form a substantially V-shaped base 216. The angle of the V forming the base can be chosen to maximise the operational efficiency of the device. It can be appreciated that the orientation of the base may be inverted such that the edge 236 faces towards the main housing 210. Alternatively, a similar base arrangement to that shown in FIGS. 1 to 5 may be used.

Within the sloping walls 234 of the base are provided a plurality of apertures 238, 240. These apertures define entry ports 238 and exit ports 240 through which liquid flow 250 (typically water such as seawater or river water) can enter and exit the housing 210. These entry and exit ports 238, 240 can be considered to form an array of valve apertures. The arrangement and number of apertures 238, 240 within the array can be tailored to the size of the device and the energy of the liquid flow. It can be appreciated that the entry and exit ports 238, 240 are relative terms defined by the direction of liquid flow 250. If the liquid flow direction 250 reverses, for example if the device is placed within a bi-directional tidal system, the entry ports will be located in the position shown by reference 240 in FIG. 6 and the exit ports will be located at the position shown by reference 238 in FIG. 6.

The exit ports 240 of the device are designed to be closed by an equivalent number of valve members 260. In the embodiment shown, these valve members 260 are balls (i.e. flotation buoys) and with the exit ports 240 together provide a plurality of check valves and in particular ball check valve arrangements. Each valve member 260 is connected to the next valve member 260 via chains 262 and eyes 264 to provide a flexible link between the valve members 260. The linked valve members 260 are tethered to the base 216 of the housing 210 at the point 236 via a curved rod or bar 266 on which the eye and chain connecting the linked valve members can freely run. The balls 260 are buoyant, with the respective buoyancy of each ball increasing along the chain (i.e. ball 260 nearest point 236 is less buoyant than the subsequent ball in the chain etc.). This allows the balls 260 to align themselves vertically when submerged and no liquid flow is incident upon them.

In the example shown, the plurality of valve members 260 together with associated exit ports 240 provide an array of ball valves which function like linked flap valves able to block flow of liquid out of the device 200 by closing exit ports 240.

Although shown as ball valves (or a number of linked flap valves), alternative valve arrangements may be used. For example, pulse valves may be used to close the valve apertures (exit ports). A pulse valve is a valve of the type where as the volume of liquid passing through the aperture increases, the pressure on the underside of the valve member suddenly becomes sufficient to snap the valve member against the aperture, closing the valve. As before, the purpose of the valves 260, 240 is to channel and regulate the flow of liquid 250 through the device 200.

The top portion of the housing 210 includes an air compression chamber 270 (a plenum chamber), which is open along one side to receive a level of liquid 272, thus entrapping air within the air compression chamber 270. In initial use, the pressure of the air trapped within the air compression chamber 270 is approximately the same as the external air pressure.

Connected to the roof 212 and sidewalls 214 of the device are chambers 280, 282 that act to store air of differing pressure. As shown, chamber 280 is an air accumulator chamber and chamber 282 is an air decompression chamber. These chambers 280, 282 are interconnected by a turbine 284 via piping 285, 286. Air valves (e.g. flap valves) 290, 292 connect the chambers 280, 282 to the air compression chamber 270. As the pressure of the air within the air compression chamber 270 becomes higher than the pressure in the chamber 280, the valve 292 is forced open by the air pressure until the air pressure within the chamber 280 and the air pressure in the air compression chamber 270 are equivalent. Conversely, if the air pressure within the chamber 282 is greater than the pressure in the air compression chamber 270, then the valve 290 opens until the air pressures are equivalent. It can be appreciated that other compatible constructional details described in relation to FIGS. 1 to 5 may also be employed in the device 200.

The operation of the device will now be described in relation to FIGS. 6 to 9. Flow lines are shown for reference only. FIG. 6 shows the device in a relaxed or initial position. In this position, the exit ports 240 are open and liquid 250 is able to enter the housing 210 via entry ports 238 and exit the housing 210 via exit ports 240. Due to the buoyancy of the valve members 260, the valves are open. As the incident liquid flow 250 acts on the valves 260, the friction of the liquid and the free tethering allow the valve members 260 to begin to move towards the exit ports (valve apertures) 240. Air valves 290, 292 are in a neutral state, with valve 290 open and valve 292 closed (due to gravity and their orientation within the device)—the pressure of air within the air compression chamber 270 and chambers 280, 282 being approximately equal.

Figure 7:
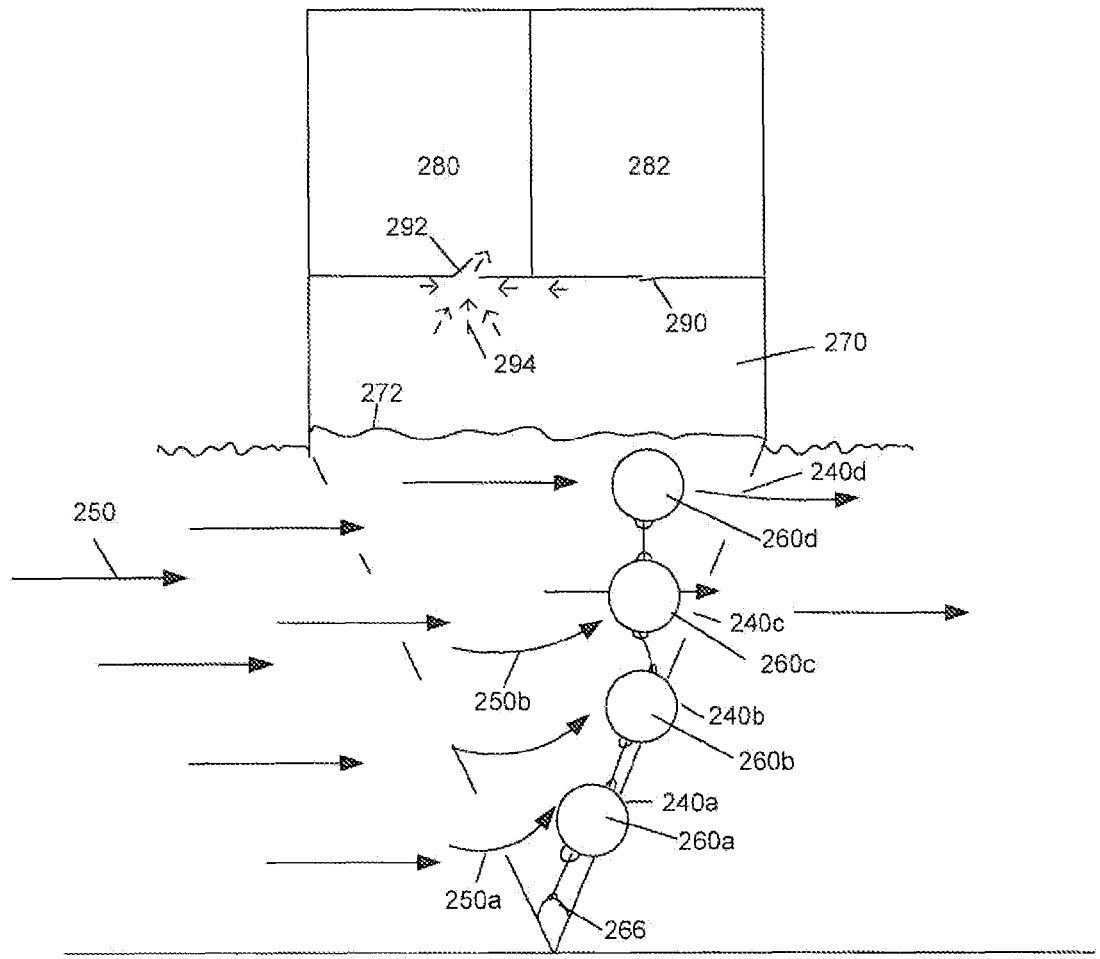
FIG. 7 is a cross-sectional view similar to FIG. 6 and shows partial closure of valves of the device due to incident liquid flow.

FIG. 7 shows the device in an intermediate position when several of the exit ports 240 have been closed by the valve members 260. The turbine 284 is present but not shown. In particular, the two lowermost valve members 260a, 260b have been pressed against corresponding exit ports 240a, 240b. As these valves slam shut, the flow of liquid through exit ports 240 is interrupted. This generates a wave or pressure surge in the liquid called a liquid hammer that causes a surge in pressure in the liquid within the housing 210. Consequently, liquid level 272 begins to rise within the air compression chamber 270. This compresses the air within the air compression chamber 270. It can be appreciated that as each exit port 240 is closed, the pressure of the liquid flow within the housing 210 and exiting the device through the remaining open exit ports 240 is increased.

Due to the pressure differential between the air in air compression chamber 270 and the air in the chambers 280, 282, valve 290 closes and valve 292 opens. Air 294 begins to flow from the air compression chamber into the accumulation chamber 280 via valve 292. Further liquid flow 250a, 250b entering the housing 210 is diverted upwards, accentuating the compression of air within the chamber 270.

Figure 8:
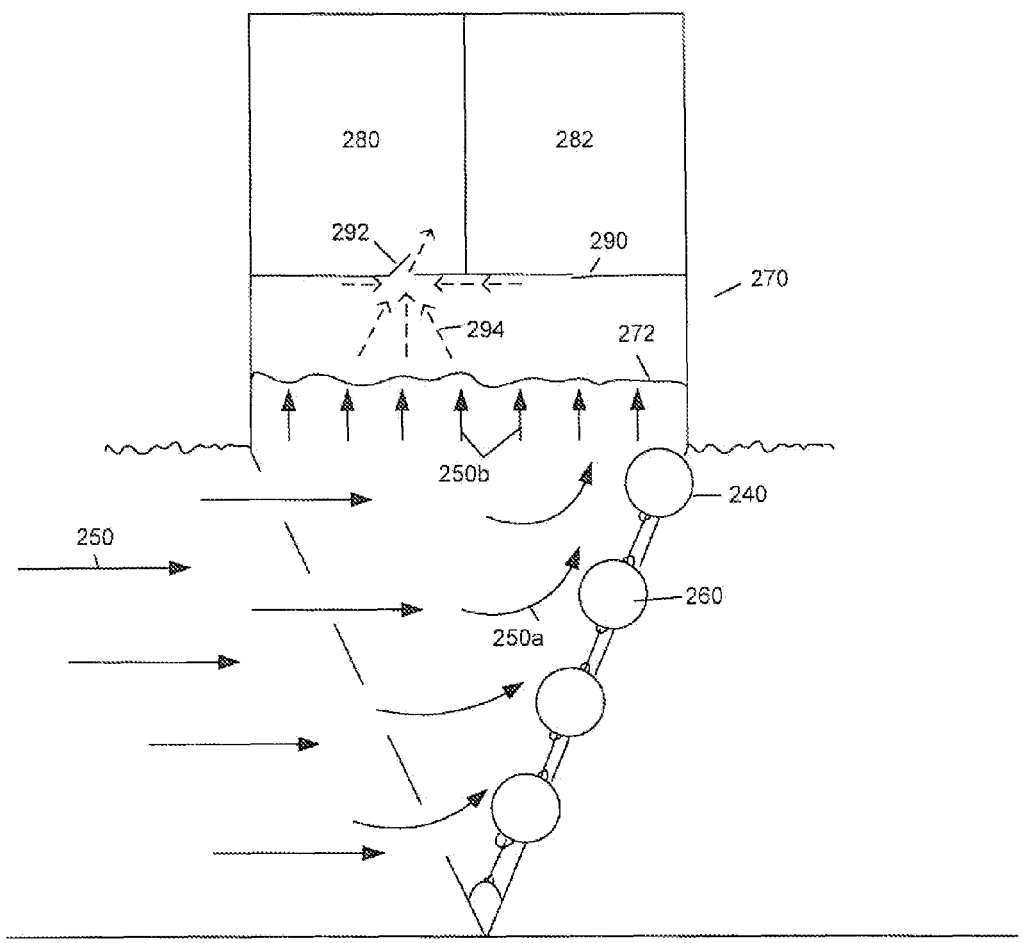
FIG. 8 is a cross-sectional view similar to FIGS. 6 and 7 and shows closure of valves due to incident liquid flow, and the subsequent upsurge of liquid into a compression chamber in the device.

This process continues as shown in FIG. 8. In this figure, all of the valves 240, 260 have been closed. The cumulative effect of the diverted incident liquid flow 250a and the increased pressure as each exit port 240 is closed creates a wave or pressure surge 250b. This increased pressure raises liquid level 272 within the air compression chamber 270, which in turn causes an increased air flow 294 into the accumulation chamber 280 through valve 292.

Figure 9:
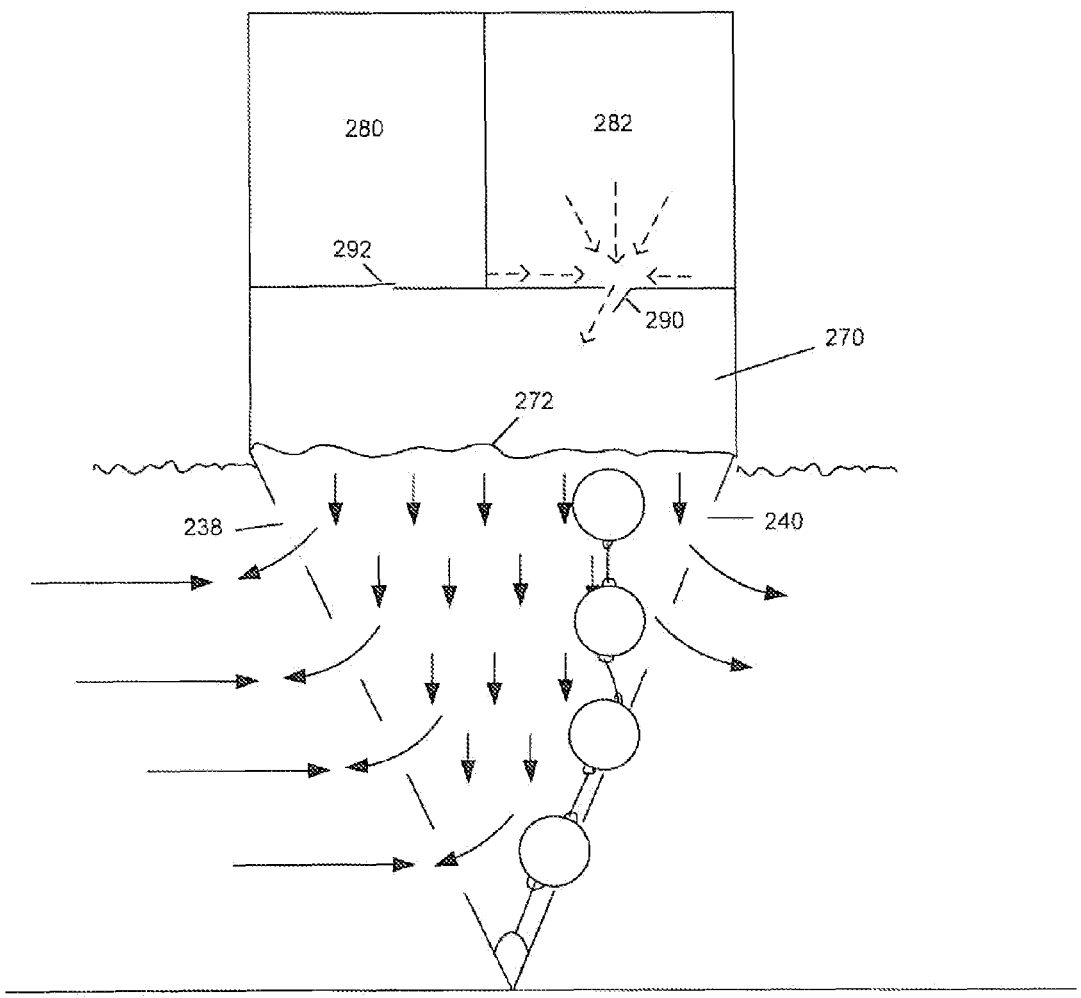
FIG. 9 is a cross-sectional view similar to FIGS. 6 to 8 and shows return flow of liquid from a compression chamber and progressive opening the opening of the valves.

Once all the valves 240, 260 are closed, the liquid pressure within the housing 210 and the air pressure in the air compression chamber 270 reaches an equilibrium position, stabilising the liquid level 272. Incident liquid flow 250 then recoils against the closed valves 240, 260 causing the pressure of the liquid within the housing 210 to drop. This, together with the effect of gravity causes the liquid level 272 to drop within the device 200. As shown in FIG. 9, with no force or pressure to keep them closed the valves member 260 float away from the exit ports 240 due to the buoyancy of the balls 260. As the liquid level 272 falls, the air pressure in the air compression chamber 270 also falls. This closes the valve 292 with the accumulation chamber 280. As the air pressure within the air compression chamber 270 is now lower than the air pressure within the decompression chamber 282, valve 290 opens and air 294 enters the air compression chamber 270. At this point, the relative pressures of the accumulation chamber 280 and the decompression chamber 282 are at their maximum. The connection between the chambers 280, 282 and the turbine 284 can then be opened, allowing air to flow from the accumulation chamber 280 to the decompression chamber 282 through the turbine 284 to generate energy until the equilibrium position shown in FIG. 6 is reached. At this point, the device 200 is reset and able to complete a new cycle.

Although shown with a single linked set of valve members 260, embodiments may include multiple sets of valve members. In such embodiments, the valve members 260 are arranged within columns and rows to form an array of valve members 260 that close an associated array of exit ports 240.

Further embodiments provide each set of valve members 260 with one or more alternative or additional tethering points. For example, in addition to being tethered to a point along edge 236, each one or set of valve members 260 may also be tethered adjacent to their corresponding exit ports 240. As such, rather than floating to the position shown in FIG. 6 during a no flow condition, the valve members are held just clear of the valve apertures (exit ports). In this case, a second set of valve members tethered adjacent to the entry ports 238 may also be provided to allow the device to be used in bi-directional flow.

What is claimed is:
1. A device for extracting energy from a liquid flow, the device comprising:
   a housing with one or more entry ports through which liquid flow can enter the housing and a plurality of exit ports through which liquid flow can leave the housing;
   an air compression chamber; and
   a plurality of valve members, operable to regulate flow of the liquid through the plurality of exit ports;
   wherein the exit ports are arranged in an array inclined in the direction of liquid flow and the valve members are operable to close the exit ports downstream of the liquid flow consecutively as the liquid flow is incident thereon, thereby progressively diverting flow of the liquid towards the air compression chamber and compressing air therein, and to open the exit ports on a return flow of liquid from the air compression chamber.

2. A device according to claim 1 further comprising an accumulation chamber for storing compressed air compressed in said air compression chamber.

3. A device according to claim 1 further comprising a turbine operable to be driven by air compressed in said air compression chamber.

4. A device according to claim 3, comprising a decompression chamber positioned downstream of the turbine for enhancing a pressure differential across the turbine during said return flow of liquid from the air compression chamber.

5. A device according to claim 1 wherein the exit ports extend in an upward gradient in the direction of the liquid flow.

6. A device according to claim 1, wherein the entry and exit ports are provided on opposing faces of the housing.

7. A device according to claim 6, wherein the entry and exit ports are interchangeable dependent on the direction of the flow of liquid.

8. A device according to claim 1, wherein the plurality of valve members and the plurality of exit ports define a plurality of check valves.

9. A device according to claim 1, wherein the valve members comprise respective buoyant elements.

10. A device according to claim 9, wherein the buoyant elements are balls and a tether connects the buoyant elements to the housing.

11. A device according to claim 9, wherein the buoyant elements have an angular displacement required to close the exit ports, the angular displacement increasing along the inclined array.

12. A device according to claim 9 wherein the buoyancy of the buoyant elements increases up the array.

13. A device according to claim 1, wherein the valve members and the exit ports are configured as pulse valves.

14. A device according to claim 13 wherein the valve members comprise spoiler elements to facilitate deflection of the liquid flow along the inclined array and/or to assist opening of the exit ports during said return flow.

15. A device according to claim 1 further comprising a stabilizer for holding the device at a predetermined position.

16. A device according to claim 1 wherein the liquid flow is one of a river liquid flow or an oceanic liquid flow.

17. A device according to claim 1 wherein the device drives a water turbine.

18. A device according to claim 1 wherein the device pumps water to a higher reservoir.

19. A network of devices comprising multiple devices according to claim 1 which are arranged or linked together.

20. A device for generating a pressure surge from a liquid flow, the device comprising:
    a housing with one or more entry ports through which a liquid flow can enter the housing and a plurality of exit ports through which the liquid flow can leave the housing;
    an air compression chamber; and
    a plurality of valve members, operable to regulate flow of the liquid through the plurality of exit ports;
    wherein the exit ports are arranged in an array inclined in the direction of liquid flow and the valve members are operable to:
        close the exit ports downstream of the liquid flow consecutively as the liquid flow is incident thereon, thus increasing the pressure of liquid within the housing and generating a pressure surge that diverts the liquid flow towards the air compression chamber, compressing air therein; and
        to open the exit ports when the pressure of liquid within the housing is reduced.

* * * * *